United States Patent [19]

Bleyer

[11] 4,189,935

[45] Feb. 26, 1980

[54] FOLDED SEAM CLOSING MACHINE

[75] Inventor: Franz Bleyer, Vienna, Austria

[73] Assignee: Peter Wukovich OHG, Vienna

[21] Appl. No.: 881,898

[22] Filed: Feb. 27, 1978

[30] Foreign Application Priority Data

Mar. 31, 1977 [DE] Fed. Rep. of Germany ....... 2714427

[51] Int. Cl.[2] ........................................ B21J 9/18

[52] U.S. Cl. ........................................ 72/452; 113/54 R

[58] Field of Search ........................ 113/54, 55, 57, 58; 72/452

[56] References Cited

U.S. PATENT DOCUMENTS 2,609,028 9/1952 Troop ................................ 113/54 X

FOREIGN PATENT DOCUMENTS 1452671 3/1969 Fed. Rep. of Germany ............. 113/54

2522752 8/1976 Fed. Rep. of Germany ............. 113/54

*Primary Examiner*—Leon Gilden

*Attorney, Agent, or Firm*—Remy J. Van Ophem

[57] ABSTRACT

The invention is a machine for closing a folded seam which utilizes two opposing cheeks driven by an eccentric drive to execute an impact movement to the cheeks. The two opposing cheeks include a helical surface which creates the fold by forming the metal from a vertical position to a horizontal position as it passes through the cheeks. Immediately behind the cheeks in the direction of movement of the work piece is a hammer which is also driven by an eccentric on a drive shaft in order to hammer the fold as it is received in its horizontal position. The hammer movement is transversed to the direction of movement of the cheeks as well as perpendicular to the direction of movement of the work piece.

11 Claims, 5 Drawing Figures

FOLDED SEAM CLOSING MACHINE

BACKGROUND OF THE INVENTION

1. Field of the Invention

The invention relates to a folded seam closing machine of the kind comprising two opposing cheeks, an eccentric drive for executing an impact movement of the cheeks on a fold located between them, a hammer for striking the fold, and a further eccentric drive for executing an impact movement of the hammer transversely to the direction of movement of the cheeks.

2. Description of the Prior Art

A folded seam closing machine has already been proposed by the applicant in which two opposing impact cheeks execute movements running in opposed directions, and in which a hammer is provided operating in an operating direction before the impact cheeks, transverse to the directions of movement of the impact cheeks. This closing machine is suitable for the closing a Z-fold or seam, where the erect fold to be folded over is bent forwards by the hammer and subsequently folded over, finished by the opposingly driven impact cheeks and brought into contact on the fold of the other work element (German Offenlegungsschrift No. 2,522,752). The hammer and the impact cheeks feature shaping surfaces. This machine is, however, not suitable for the closing of a corner fold, such as the so-called Pittsburgh Fold.

This also applies to another known folded seam closing machine (German Auslegeschrift No. 1,452,671) in which also the fold to be folded over is bent forwards by a driven hammer and then enters between two cheeks, of which only one cheek is driven. As this machine inclines to lift away from the fold to be closed, and the forward thrust is deficient, it cannot be expected that it is suitable for the closing of a corner fold or seam. Thus, a practical tool is lacking which permits the production of corner seams in a simple manner, on site.

Until now, for joining together sheet metal parts such as for air and air-conditioning plants, or also, for example, when constructing facings, the corner folds, which are partly pre-finished during manufacture, are closed by hand by means of a hammer. This has been necessary if the high costs of transporting completely finished sheet metal parts, ducting, shaped pieces etc., or of erecting fixed seam-closing machines on site, are to be avoided. These fixed machines work with sets of rollers to close the seam, and are of large dimensions to allow the pushing-through of the sheet metal parts to be folded.

SUMMARY OF THE INVENTION

The essential task of the invention is to create a folded seam closing machine which is suitable for the clean, even and rapid closing of corner seams such as the Pittsburg Fold.

With the seam closing machine of the kind mentioned in the introduction, the task is resolved according to the invention in that the cheeks bending forwards the fold are each provided with a surface, for carrying out a shaping action on the fold, which is formed like a screw surface, and in that the hammer making the fold is located behind the cheeks in the direction of operation.

The fold entering between both cheeks is thus firstly bent forwards and over between the shaping surfaces in a progressive manner, and the fold is alternately gripped between the two cheeks and released for the thrust forward and, after emerging from the cheeks, beaten down by the hammer and brought into contact position. In this manner, the Pittsburgh Fold on sheet metal tubes, elbow and transition pieces can be easily closed without problems and with high operational speed. Because of the low weight and the easy handling of the device, an operation which is free from fatigue results. The joining together of sheet metal parts delivered dismantled to a site can be economically carried out.

According to a further characteristic of the invention, one cheek is formed as an anvil block, against which the fold to be folded is struck by the driven cheek.

Furthermore, the driven cheek may be provided with a guide profile which engages with the seam outside of the area to be folded over. In this manner, a lifting-off of the seam closing machine is prevented and the machine is guided during the thrust forward in the longitudinal direction.

In a further development of the invention, the cheek serving as an anvil block can be swivelled against the thrust of a spring. Thus, the placing of the seam closing machine on the workpiece is facilitated. For placing, the cheek is first swivelled away, whereupon the device is applied to the workpiece at the tacked start of the seam.

Further, the driven cheek may be formed at the free end of a two-armed lever pivotable about a pin, the other end of which lever is connected to a bearing bush enclosing an eccentric or cam on a driving shaft.

According to a further characteristic, at least one cup spring may be arranged between the bearing bush and the end of the lever.

The drive of the impact cheek may thus be characterised by simple construction, low space requirement, great reliability and by quiet running. The bearing bush follows the movement of the cam on the drive shaft and the drive transfer to the driven impact cheek takes place by way of shockproof cup springs.

In a further development of the invention, the cheeks are formed as replaceable inserts. Thus, the device can be matched to varying seam heights in a simple manner. On the other hand, adjustment for differing thicknesses of material, as usually employed, is not necessary.

Further, the impact surface of the hammer preferably extends in one plane transversely to the direction of impact of the driven cheek. The impact surface of the hammer can be provided with a chamfer in the direction of operation. Thus, the insertion of the pre-formed fold between the cheeks is facilitated and easier pushing forward of the device is achieved. Finally, the fold is brought flat into contact with the opposite fold by the even surface of the hammer.

In one embodiment of the invention, the hammer is formed in two parts which can be adjusted with respect to each other for lift adjustment.

According to a further characteristic of the invention, the hammer may be directly driven by an eccentric provided next to the eccentric for the impact cheek drive, on the driving shaft. In this manner, the construction of the machine is economic with respect to space requirement and the folded seam closing machine can be coupled to an electric drill, as an attachment.

According to a further characteristic of the invention, the impact movements of the driven cheek and of the hammer may feature a phase displacement of more than 90 angular degrees, in particular of about 105 angular degrees. Thus, an easy forward movement of the closing machine is made possible which leads to a high operational speed which can be of the order of 2 m/min.

BRIEF DESCRIPTION OF THE DRAWINGS

In the following, an embodiment of the invention is explained in greater detail with the aid of the accompanying drawings, in which.

DETAILED DESCRIPTION OF THE PREFERRED EMBODIMENT

Figure 1:
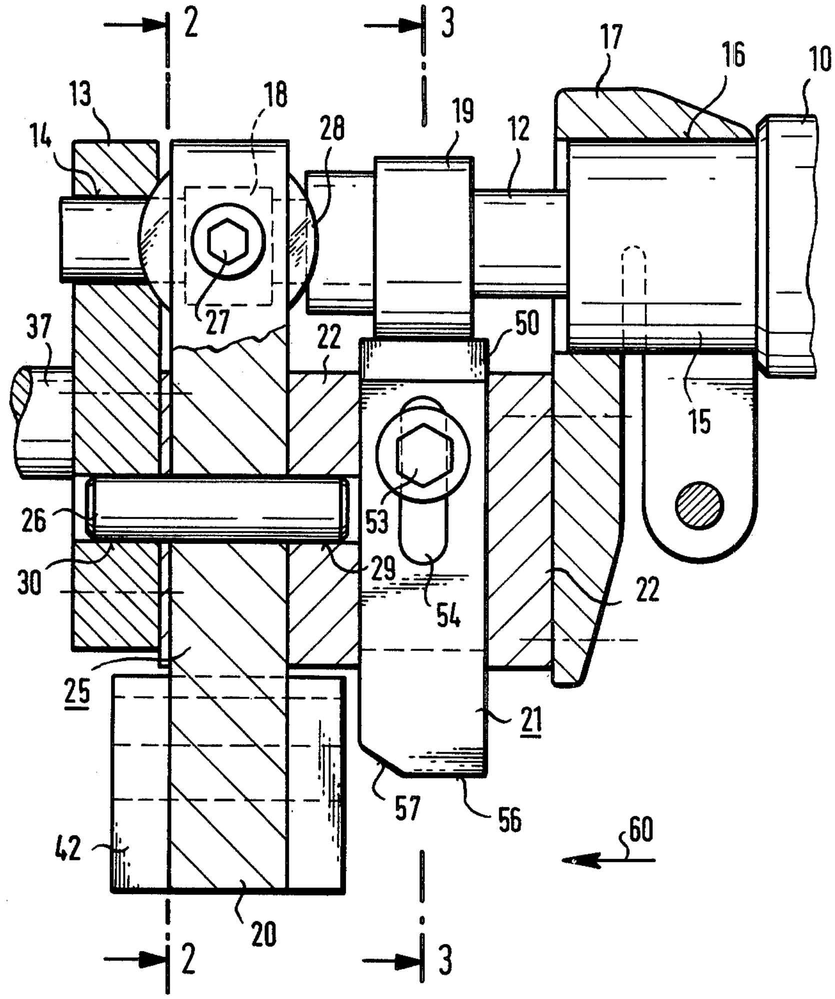
FIG. 1 is an axial section through the closing machine.

In FIG. 1, a drilling machine 10, not shown in detail, is provided with an extended drive shaft 12 the front end of which is borne at 14 in an end plate 13. A bearing shell 15 of the front bearing of the drilling machine 10 is located in a bore 16 in a housing plate 17 which is clamped in the usual manner to the bearing shell 15.

The drive shaft 12 features two eccentrics or cams 18, 19, spaced axially one behind the other. A movable impact cheek 20 is driven by the eccentric 18 and a hammer 21 is driven by the eccentric 19.

To the housing plate 17, a housing block 22 is fastened by means of screws, not shown in detail. The end plate 13 is attached to the opposite side of the housing block 22. The housing block 22 serves as a mounting for the hammer 21 and the impact cheeks, as can be seen in greater detail from FIGS. 2 and 3. A housing cover, not shown, can be easily attached to the bearing plate 17.

Figure 2:
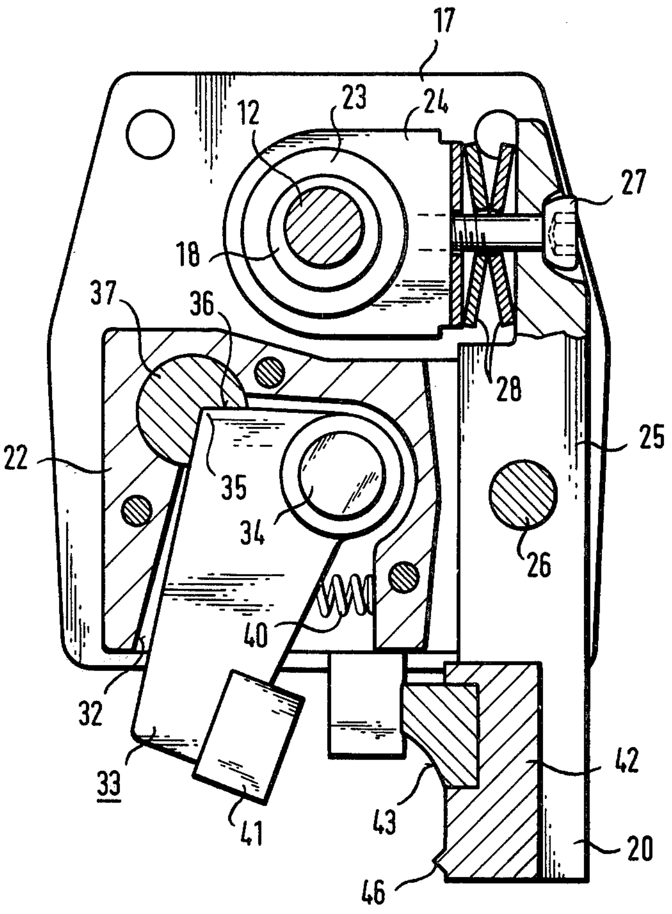
FIG. 2 is a section along the line 2—2 of FIG. 1.
Figure 3:
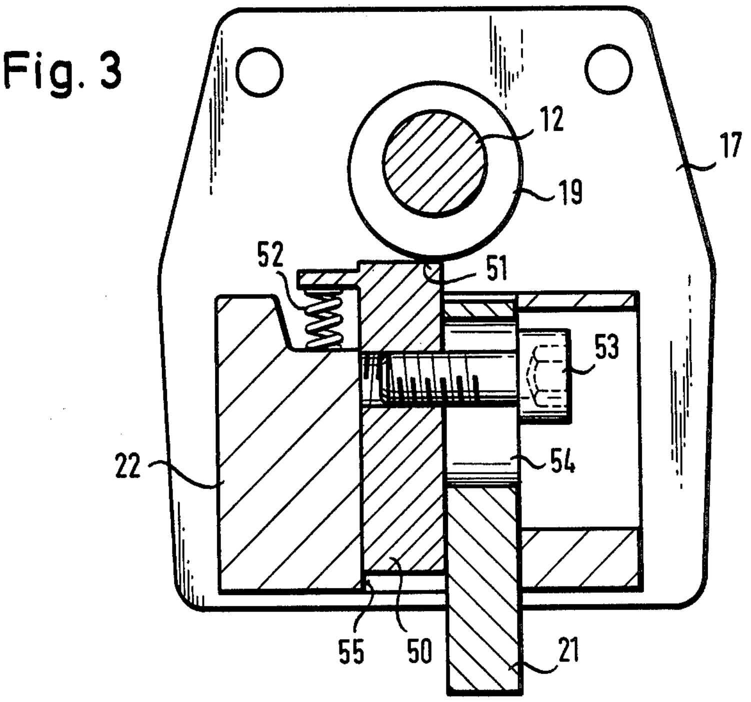
FIG. 3 is a section along the line 3—3 of FIG. 1.

The end view of the closing machine, shown in FIG. 2, discloses the arrangement of the impact cheeks. The eccentric 18 on the drive shaft 12 is rotatable within a ring 23, which is located, for its part, in a bore in a bearing bush 24. Thus, reciprocal movement is imparted to the bearing bush 24 by rotation of the drive shaft 12, which movement is transferred to a two-armed lever 25 which is pivotally mounted, about half way along its length, to a pin 26, and carries the impact cheek 20 on its lower end. The upper end of the lever 25 is connected by means of a screw 27 to the bearing bush 24. Between the bearing bush 24 and the lever 25 several cup springs are inserted to effect a resilient transfer of force. The pin 26, as can be seen from FIG. 1, is supported at one end in a bore 29 in the housing block 22 and, at its other end, in a bore 30 in the end plate 13.

A further impact cheek 33, serving as a contact block, is located in a recess 32 of the housing block 22 and is pivotally mounted on a bearing bolt 34. In the position shown in FIG. 2, the cheek 33 is shown in a pivoted-away position in which the upper corner 35 of the cheek 33 engages in a correspondingly formed recess 36 in a shaft 37, which is also accommodated rotatably in the housing block 22. The shaft 37 passes through the end plate 13 and can be rotated by means of a lever, not shown, fastened to the protruding end, whereby the corner 35 of the cheek 33 may be pushed out of the recess 36 so that the cheek 33 swings into a closed position in which it is held by the cylindrical circumference of the shaft 37 on which the upper edge of the corner 35 of the cheek 33 is supported. In this manner, the cheek 33 can easily be pivoted away from the cheek 20 in order to make possible the placing into position of the closing machine. Thereafter, the cheek 33 is pivoted by means of the shaft 37 and secured in the closed position in which it serves as an anvil block. A spring 40 inserted between the cheek 33 and the housing block 22 biases the cheek 33 towards the open position.

Figure 4:
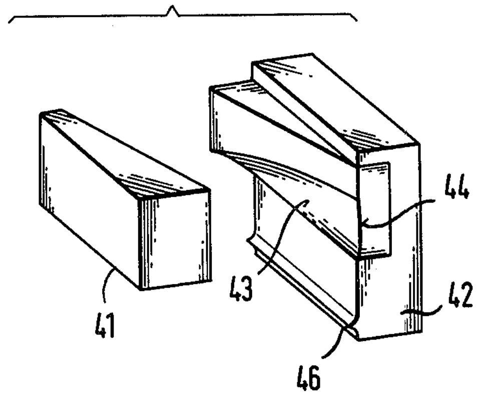
FIG. 4 is a perspective view of the impact cheeks.

The cheek 33 serving as an anvil block and the driven cheek 20 feature recesses into which replaceable cheek inserts 41, 42 are fastened. The shape of the cheek inserts is shown, in particular, in FIG. 4. Thus, the driven impact cheek insert 42 exhibits a shaping surface 43 which is formed like a screw. Accordingly, the shaping surface 43 possesses a practically vertical front edge 44 into which the fold 45 (see FIG. 5), which is to be folded over and is still upright, enters. By the impact movement, the fold 45 is now, on the forward movement of the closing machine, laid-over and folded-down along the screw-shaped, curved, shaping surface 43. For this, the cheek 33 serving as an anvil block is provided with a corresponding shaping surface (not shown in FIG. 4). Below the shaping surface 43, the movably driven impact cheek insert 42 features a guide profile 46 which engages in a groove 47, shown in FIG. 5, of the pre-formed fold. As the stroke of the movable impact cheek is small, the guide profile 46 cannot come out of engagement with the folding groove 47, whereby the lifting-away upwards of the closing machine is prevented. The impact cheek inserts 41, 42 are fastened detachably to the impact cheeks 20, 33 respectively so that they can easily be exchanged for differing heights of the fold 45.

Figure 5:
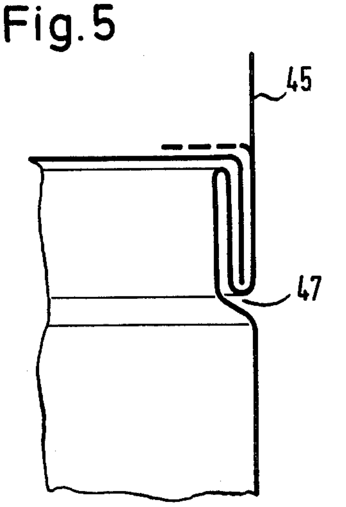
FIG. 5 shows the profile of the Pittsburgh Fold to be closed with the closing machine.

After the emergence of the fold 45, which is folded diagonally downwards, from between the impact cheeks, this is struck by the hammer 21 and so beaten down that it assumes the position shown in dotted lines in FIG. 5, whereby the Pittsburgh Fold is closed. The hammer 21 can be adjusted for height and is fastened to a drive member 50 whose upper edge 51 is urged into engagement with the eccentric 19 by means of a spring 52. The hammer 21 is clamped onto the drive member 50 by means of a screw 53 which passes through a slot 54 in the hammer 21 so that the height of the hammer 21 may be adjusted. The hammer 21, with the drive member 50, is positioned in a bore 55 in the housing block 22 so that it can be displaced up and down.

The underside 56 (see FIG. 1) of the hammer 21 is formed flat, whilst the front edge of the hammer 21 lying in the operational direction is provided with a chamfer 57 in order to facilitate the forward movement and insertion of the fold 45.

The operational direction of the closing machine is indicated in FIG. 1 by the direction of the arrow 60.

The eccentrics 18, 19 on the drive shaft 12 are opposed in such a manner that, between the closing movement of the driven cheek 20 and the blow of the hammer 21, a phase displacement occurs. This phase displacement amounts to at least 90 angular degrees and, preferably, 105 angular degrees, i.e. additional to the rotation of the eccentrics dependent on the drive of 90°, the eccentric 19 is displaced by a further 15° so that the hammer 21 strikes at a phase displacement of 15° after closing of the cheeks, whereby a movement forwards which is free from jamming is obtained and a lifting-off of the machine is avoided.

We claim:

1. A machine for closing a folded seam, said machine comprising:

at least two opposing cheeks, one of said cheeks formed as an anvil, the other of said cheeks being driven, said at least two opposing cheeks further comprising opposed complementary helical surfaces juxtaposed to carry out the shaping action of the fold;

eccentric drive means engaging said cheeks for executing an impact movement of the cheeks on a fold located between one and the other of said cheeks; and a hammer mounted contiguous to said eccentric drive means for striking said fold, said hammer cooperating with said eccentric drive means to execute an impact movement of the hammer transversely to the direction of movement of the cheeks, said hammer striking said fold further being located in a first position following the cheeks in the direction of operation.

2. The closing machine according to claim 1, wherein the driven cheek further comprises a guide profile which engages the fold outside of the area to be folded over.

3. The closing machine according to claim 1 wherein said eccentric drive means further comprises:

a driving shaft having a first and second eccentric portions coaxially disposed with said driving shaft for rotation therewith; and a two-armed level having one end connected to a bearing bush, said bearing bush enclosing said first eccentric of the driving shaft, said two-armed level further having an opposite end with the driven cheek formed thereon.

4. The closing machine according to claim 3, wherein at least one cup spring is arranged between the bearing bush and the one end of the lever.

5. The closing machine according to claim 1, wherein the cheeks are formed as replaceable inserts.

6. The closing machine according to claim 1 further including an impact surface of the hammer which extends in one plane transversely to the direction of impact of the driven cheek.

7. The closing machine according to claim 6, wherein the impact surface of the hammer is provided with a chamfer in the direction of operation.

8. The closing machine according to claim 1, wherein the hammer comprises a first portion; a second portion adjacent said first portion; and lift adjustment means to permit adjustment of said first portion with respect to said second portion.

9. The closing machine according to claim 3, wherein the hammer is directly driven by said second eccentric portion provided next to the first eccentric portion for the impact cheek drive, on the driving shaft.

10. The closing machine according to claim 3, wherein the first eccentric portion and the second eccentric portion have a phase displacement of at least 90 angular degrees.

11. The closing machine according to claim 1 further comprising means for pivoting said one of said cheeks in a first direction towards said other of said cheeks; and means for biasing said one of said cheeks in a direction away from said other of said cheeks.

* * * * *